United States Patent
Chen et al.

(10) Patent No.: US 9,944,567 B2
(45) Date of Patent: Apr. 17, 2018

(54) METHOD OF INHIBITING IRREGULAR AGGREGATION OF NANOSIZED POWDER

(71) Applicant: NATIONAL CHUNG SHAN INSTITUTE OF SCIENCE AND TECHNOLOGY, Taoyuan (TW)

(72) Inventors: Li-Jiuan Chen, Taoyuan (TW); Yen-Chung Chen, Taoyuan (TW); Hong-Fang Huang, Taoyuan (TW); Yu-Chun Wu, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 186 days.

(21) Appl. No.: 15/150,546

(22) Filed: May 10, 2016

(65) Prior Publication Data
US 2017/0327426 A1   Nov. 16, 2017

(51) Int. Cl.
*C04B 41/80* (2006.01)
*C04B 35/44* (2006.01)

(52) U.S. Cl.
CPC ............ *C04B 41/80* (2013.01); *C04B 35/44* (2013.01); *C04B 2235/3217* (2013.01); *C04B 2235/3224* (2013.01); *C04B 2235/3225* (2013.01)

(58) Field of Classification Search
CPC ..... B01D 9/00; C01F 5/02; C01F 7/02; C01F 7/028; C01F 17/0018; C01G 3/02; C01G 9/02; C01G 17/02; C01G 19/02; C01G 21/02; C01G 23/003; C01G 23/005; C01G 23/006; C01G 23/04; C01G 25/02; C01G 27/02; C01G 30/005; C01G 31/02; C01G 37/02; C01G 39/02; C01G 41/02; C01G 43/02
See application file for complete search history.

(56) References Cited

PUBLICATIONS

Palmero, Paola, et al. "Effect of heating rate on phase and microstructural evolution during pressureless sintering of a nanostructured transition alumina." International Journal of applied ceramic technology 6.3 (2009): 420-430.*

(Continued)

*Primary Examiner* — Richard M Rump
(74) *Attorney, Agent, or Firm* — Schmeiser, Olsen & Watts, LLP (57) ABSTRACT

A method of inhibiting an irregular aggregation of a nanosized powder includes (A) providing a nanosized ceramic powder to perform thereon a thermal analysis and thereby attain an endothermic peak temperature; (B) performing an impurity-removal heat treatment on the nanosized ceramic powder at a temperature higher than the endothermic peak temperature; (C) switching the nanosized ceramic powder from a temperature environment of the impurity-removal heat treatment to an environment of a temperature higher than a phase change temperature of the nanosized ceramic powder, followed by performing a calcination heat treatment on the nanosized ceramic powder in the environment of the temperature higher than the phase change temperature of the nanosized ceramic powder, wherein the nanosized ceramic powder skips the temperature environment between impurity-removal heat treatment and calcination heat treatment to shun generating a vermicular structure, avoid crystalline irregularity and abnormal growth, reduce particle aggregation, and achieve satisfactory distribution.

9 Claims, 8 Drawing Sheets

(56) References Cited

PUBLICATIONS

Tartaj, Jesus, et al. "Sol-gel Cyclic Self-Production of α-Al2O3 Nanoseeds as a Convenient Route for the Low Cost Preparation of Dense Submicronic Alumina Sintered Monoliths." Advanced Engineering Materials 4.1-2 (2002): 17-21.*

* cited by examiner

METHOD OF INHIBITING IRREGULAR AGGREGATION OF NANOSIZED POWDER

FIELD OF THE INVENTION

The present invention relates to methods of preparing nanosized powder and, more particularly, to a method of inhibiting an irregular aggregation of nanosized powder.

BACKGROUND OF THE INVENTION

It is difficult for nanosized ceramic powder of a particle diameter of 100-500 nm to be well distributed and appropriately sintered, because a conventional solid-state reaction route is much constrained by the quality of starting materials. Agglomeration or uneven distribution of particle diameters of starting nanosized powder materials necessitates additional processing steps which precede whatever starting material-based steps. Furthermore, due to low diffusion coefficients of solid-state substances, nanosized powder produced by the solid-state reaction route cannot exist in a pure phase unless it is processed at a relatively high heat treatment temperature. However, when carried out at a high temperature for a long period of time, heat treatment leads to vermicular aggregation among crystallites—an intractable problem that confronts nanosized ceramic powder preparation processes nowadays. For instance, pure-phase YAG particles in nanosized powder can be synthesized by a conventional solid-state reaction route only at a relatively high heat treatment temperature (>1600° C.) and, unfavorably, on condition that the YAG particle diameters are often larger than 1 μm.

YAG nanosized powder can also be produced by a sol-gel process and, favorably, at a relatively low temperature, say less than 700° C., directly from an amorphous substance through crystallization. However, the sol-gel process requires a subsequent heat treatment process. Likewise, YAG nanosized powder can also be produced by a hydrothermal method which, apart from the aforesaid heat treatment process, requires a high pressure process and thereby is restrained by supercritical conditions of water.

Chemical coprecipitation, which is often used to synthesize YAG powder, entails coprecipitating highly soluble Y and Al, such as $YNO_3$ and $AlNO_3$, with a precipitant to produce a solid-state precipitate, and then the solid-state precipitate undergoes a heat treatment process to produce a YAG starting powder. Advantages of chemical coprecipitation include: Y, Al and Nd ions are uniformly distributed to an atomic level, YAG phase structure is directly formed in an amorphous state, usually greatly decreasing the temperature required for crystallization, and precluding a transition phase, such as the formation of YAP ($YAlO_3$) or YAM ($Y_4Al_2O_9$), but its YAG powder particle diameter is small and thus have to undergo a calcination process to allow the crystal to grow from 50 nm to 220 nm. However, aggregation among the crystals increases with the calcination temperature. Hence, the sintering density is compromised.

Hence, manufacturers nowadays deem it important to provide a method of inhibiting an irregular aggregation of a nanosized powder to thereafter process nanosized powders (starting materials) produced by different process techniques so as to enhance process efficiency and nanosized powder crystal quality, and avoid crystalline irregularity and abnormal growth, such as overlapping and prepare a nanosized powder that features reduced particle aggregation and satisfactory distribution.

SUMMARY OF THE INVENTION

In view of the aforesaid drawbacks of the prior art, it is an objective of the present invention to provide a method of inhibiting an irregular aggregation of a nanosized powder, integrate a nanosized ceramic powder, a thermal analysis, an endothermic peak temperature, a preheat treatment and a calcination heat treatment, efficiently prevent powder aggregation which might otherwise occur during a heating process, and produce a nanosized powder which features satisfactory distribution and a microscale size.

Preparation of a compact nanosized ceramic powder requires giving considerations to the sintering activity of the powder. The sintering activity of the powder mostly depends on the size, shape, particle diameter distribution, chemical ingredients, agglomeration degree, and purity of the powder, wherein the reduction of particulate size and the enhancement of powder uniformity is effective in enhancing the sintering activity of the powder. However, the reduction of powder size readily leads to agglomeration and reduced powder uniformity. Hence, the sintering activity has to strike a balance between size and uniformity to allow the optimal sintering activity to take place in the event of a specific particulate size. Hence, given technical improvement in powder uniformity, not only does the optimal particulate size corresponding to the optimal sintering activity decreases, but the sintering activity also increases.

In order to achieve the above and other objectives, the present invention provides a method of inhibiting an irregular aggregation of nanosized powder, comprising the steps of: (A) providing a nanosized ceramic powder to perform thereon a thermal analysis and thereby attain an endothermic peak temperature; (B) performing an impurity-removal heat treatment on the nanosized ceramic powder at a temperature higher than the endothermic peak temperature; (C) switching the nanosized ceramic powder from a temperature environment of the impurity-removal heat treatment to an environment of a temperature higher than a phase change temperature of the nanosized ceramic powder, followed by performing a calcination heat treatment on the nanosized ceramic powder in the environment of the temperature higher than the phase change temperature of the nanosized ceramic powder, wherein the nanosized ceramic powder skips the temperature environment between the impurity-removal heat treatment and the calcination heat treatment to shun generating a vermicular structure.

The thermal analysis is differential thermal analysis (DTA)/thermogravimetric analysis (TG) intended to gain insight into the thermal behavior of starting nanosized powder. With the DTA curve, it is feasible to identify the location of the endothermic peak and its temperature (endothermic peak temperature). Hence, the temperature at which the chemical residues of nanosized ceramic powder (starting nanosized powder) decompose is estimated by inference, so as to identify the related processing temperature.

In step (A), the nanosized ceramic powder is a Nd:YAG powder prepared by following the steps of: (a) mixing an ammonium bicarbonate aqueous solution and a Nd:YAG precursor solution to produce a precipitate of the Nd:YAG powder, wherein the Nd:YAG precursor solution is prepared by dissolving an aluminium nitrate, a yttrium nitrate and a neodymium nitrate in deionized water; (b) obtaining the Nd:YAG powder by a centrifugal process, followed by rinsing the Nd:YAG powder with alcohol; and (c) placing the Nd:YAG powder in an oven for drying.

According to the present invention, when the nanosized ceramic powder is a Nd:YAG powder, the Nd:YAG powder (starting nanosized powder) is analyzed by DTA/TG to thereby determine that the endothermic peak temperature is 250° C. approximately and that the phase change temperature is above 1100° C. Hence, the range of the process temperature of the impurity-removal heat treatment in step (B) is 250-350° C., whereas the range of the process temperature of the calcination heat treatment in step (C) is 1200-1400° C. Alternatively, the calcination heat treatment is performed on Nd:YAG powder (starting nanosized powder) at 1200° C. or so.

The above overview and the description below as well as the accompanying drawings aim to further explain the techniques and means used to achieve the intended objectives of the present invention and the effects thereof. The other objectives and advantages of the present invention are illustrated with the accompanying drawings and described below.

DETAILED DESCRIPTION OF THE PREFERRED EMBODIMENTS

The implementation of the present invention is hereunder illustrated with specific embodiments to allow persons skilled in the art to gain insight into the advantages and benefits of the present invention with reference to the disclosure of the specification.

Preparation of compact transparent YAG ceramics requires giving considerations to sintering activity of a powder. The sintering activity of a powder depends mostly on the size, shape, distribution of particle diameters, chemical ingredients, degree of agglomeration, and purity of the powder. The sintering activity of a powder can be effectively enhanced by decreasing the particulate size of the powder and increasing the uniformity of the powder. However, decreasing the particulate size of a powder leads to agglomeration and reduces the uniformity of the powder. The sintering activity is optimized by striking a balance between particulate size and uniformity. As a result, maximum sintering activity is restricted to a specific particulate size. In view of this, the optimal particulate size corresponding to the optimal sintering activity will decrease, and the sintering activity will increase, as a result of any technical improvement in powder uniformity.

The prior art usually focuses on the preparation of nanosized powder either to the detriment of the appropriateness of nanosized powder size or to lead to powder aggregation. By contrast, the present invention teaches analyzing the characteristics of a powder with fundamental thermal analysis curves to thereby identify an appropriate temperature process interval, then eliminate the impurity phase left on the interface under a low-temperature process condition, and finally effectuate phase change and crystal growth rapidly at high temperature during a short period of time, so as to avoid crystalline irregularity and abnormal growth, such as overlapping and prepare a nanosized powder that features reduced particle aggregation and satisfactory distribution.

Figure 1:
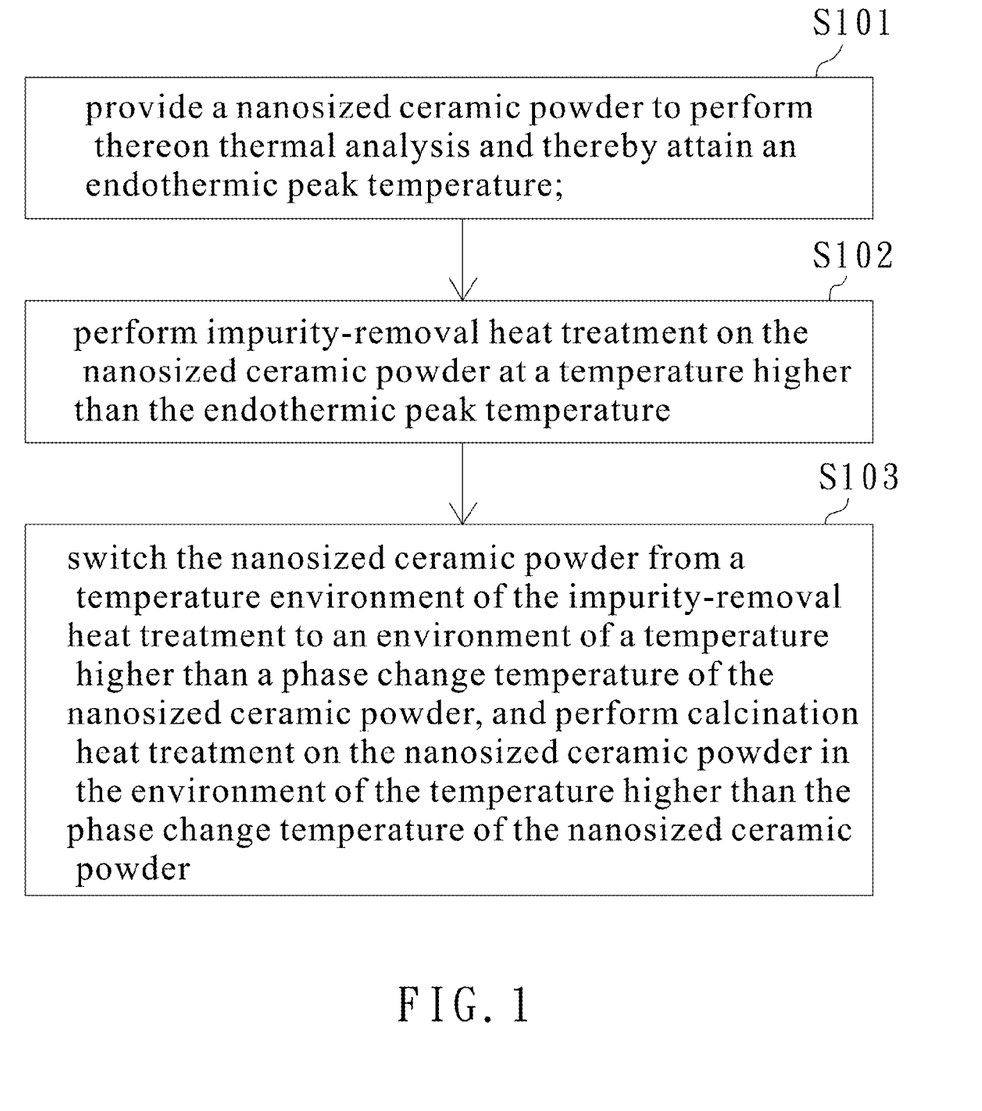
FIG. 1 is a schematic view of the process flow of a method of inhibiting an irregular aggregation of nanosized powder according to the present invention.

Referring to FIG. 1, there is shown a schematic view of the process flow of a method of inhibiting an irregular aggregation of nanosized powder according to the present invention. As shown in the diagram, the method of inhibiting an irregular aggregation of nanosized powder comprises the steps of: (A) providing a nanosized ceramic powder to perform thereon a thermal analysis and thereby attain an endothermic peak temperature (S101); (B) performing an impurity-removal heat treatment on the nanosized ceramic powder at a temperature higher than the endothermic peak temperature (S102); (C) switching the nanosized ceramic powder from a temperature environment of the impurity-removal heat treatment to an environment of a temperature higher than a phase change temperature of the nanosized ceramic powder, followed by performing a calcination heat treatment on the nanosized ceramic powder in the environment of the temperature higher than the phase change temperature of the nanosized ceramic powder (S103), wherein the nanosized ceramic powder skips the temperature environment between the impurity-removal heat treatment and the calcination heat treatment to shun generating a vermicular structure.

The present invention relates to a nanosized powder which exhibits satisfactory sintering characteristics by undergoing an impurity-removal process rapidly at high temperature. In an embodiment of the present invention, the precipitation of the starting nitrates (sources of Y, Al and Nd) is addressed and described below. By introducing a precipitant and configuring related parameters, such as the proportion of the precipitant, it is feasible to adjust the pH and ion concentration of a gel coprecipitate in an appropriate control solution to reduce agglomeration of the gel coprecipitate, perform calcination by two-stage nanosized powder pretreatment, effectively promote a complete phase change procedure and control the particulate size, and preclude powder aggregation which might otherwise occur as a result of crystal overgrowth. Hence, the present invention retains the uniqueness of the nanosized powder and renders it insusceptible to abnormal growth.

An embodiment of the present invention includes the steps as follows:

First, a nanosized YAG powder is prepared in two steps. In step 1, the present invention uses an ammonium bicarbonate as a precipitant and uses aluminium nitrate, yttrium nitrate and neodymium nitrate as precursor salts. First, using aluminium nitrate, yttrium nitrate and neodymium nitrate as precursor salts involves dissolving them in deionized water according to the molar ratio, that is, Nd:Y:Al=0.003:2.997:5, to produce 0.1-0.5 M of a YAG ($Y_3Al_5O_{12}$) aqueous solution, dissolving the ammonium bicarbonate in deionized water to produce 0.4-3 M of a precipitant aqueous solution, introducing the Nd:YAG aqueous solution, with a medical intravenous drip infusion tube and a low constant infusion flow rate of 1 ml/min, into the ammonium bicarbonate aqueous solution, or pour the Nd:YAG aqueous solution into the ammonium bicarbonate aqueous solution. In step 2, the ammonium bicarbonate is dripped (or poured) into the Nd:YAG aqueous solution to instantly produce a white precipitate, wherein the whole precipitation process is accompanied by a blending process that lasts 24 hours (but the present invention is not limited thereto) until the reaction happens thoroughly. In step 3, a solid-state powder precipitate is obtained by a centrifugal technique and a repeated rinsing process performed with alcohol, and then the solid-state powder precipitate is placed in an oven operating at 100° C. (but the present invention is not limited thereto) to undergo a drying process for 24 hours (but the present invention is not limited thereto).

Figure 2:
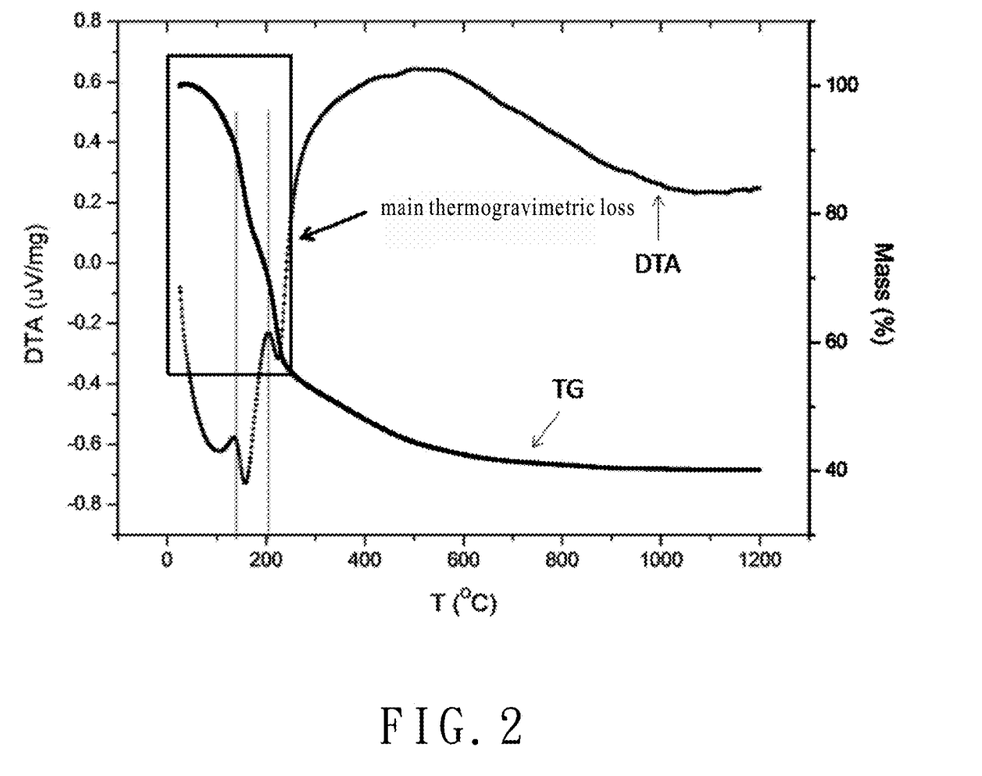
FIG. 2 is a graph of DTA/TG of a nanosized YAG powder of the present invention.

Second, the nanosized YAG powder undergoes a calcination process as follows:

Referring to FIG. 2, there is shown a graph of DTA/TG of a nanosized YAG powder of the present invention. As shown in FIG. 2, according to the present invention, to prevent chemical residues from affecting the sintering of the powder, it is necessary for the starting precipitate to be analyzed with differential thermal analysis (DTA)/thermogravimetric analysis (TG) in order to evaluate the thermal behavior of the starting powder. As shown in FIG. 2, the temperature rises at a rate of 10° C. per minute. The DTA curve shows two conspicuous endothermic peaks at 180° C. and 250° C., respectively, and around 50% thermogravimetric loss occurs at these temperatures, indicating that the chemical residues decompose at these temperatures. Hence, in this embodiment, the nanosized YAG powder undergoes preheat treatment at 300° C. to get rid of most of its chemical residues and then be placed in a pipe-shape furnace, which is already preheated to reach temperatures of 1200° C. and 1400° C., to undergo calcination for one hour.

Figure 3:
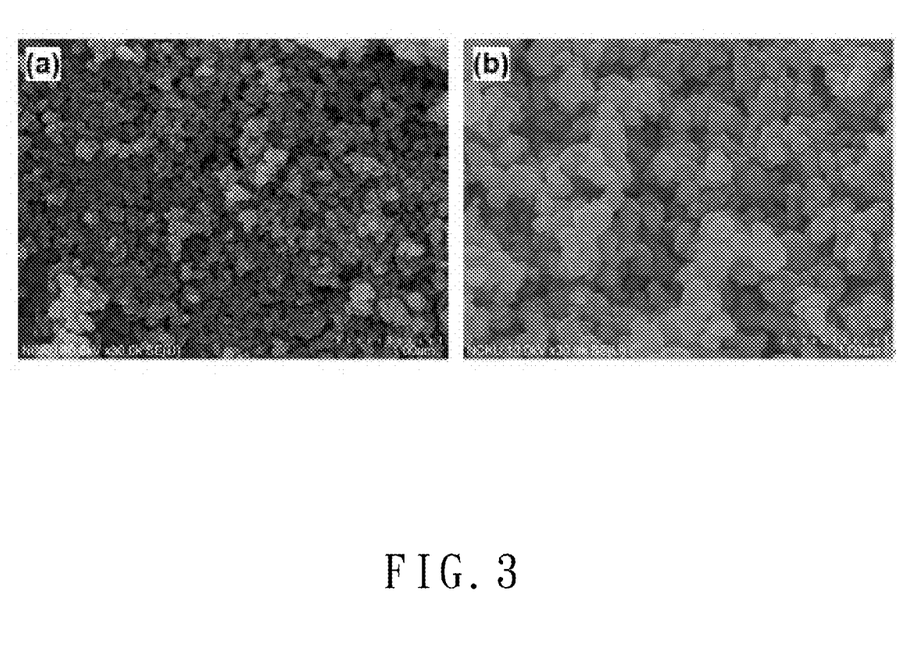
FIG. 3 shows SEM pictures of the nanosized YAG powder calcinated at 1200° C. (picture a) and 1400° C. (picture b) according to the present invention.
Figure 4:
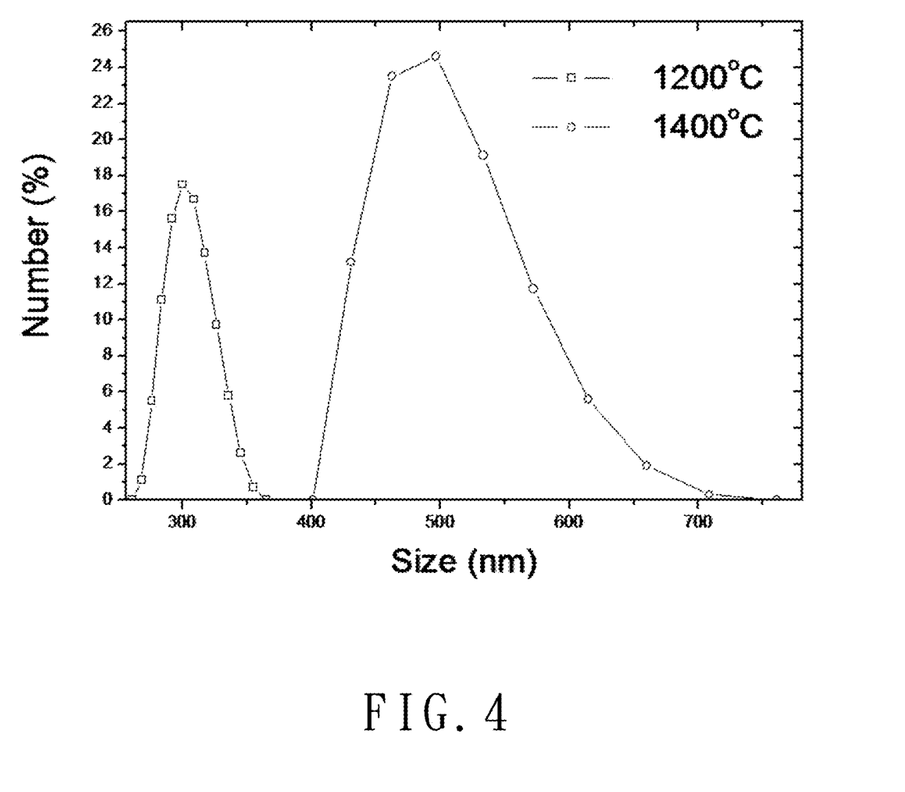
FIG. 4 is a graph of the distribution of particle diameters of the nanosized YAG powder calcinated according to the present invention.

Referring to FIG. 3, there are shown SEM pictures of the nanosized YAG powder calcinated at 1200° C. (picture a) and 1400° C. (picture b) according to the present invention. Referring to FIG. 4, there is shown a graph of the distribution of particle diameters of the nanosized YAG powder calcinated according to the present invention. Referring to FIG. 3, the phase change and crystal growth taking place at 1200° C. and 1400° C. occurs by a self-integration mechanism to thereby take less time staying at a lower temperature, say <1100° C., and thus preclude a vermicular structure which might other arise from the mutual sintering of crystals. At 1400° C., since the calcination temperature is high, the average particle diameter reaches 445.6 nm, with a standard deviation of 63.3 nm. An analysis of the powder particle diameters of a sample obtained when the temperature-holding temperature decreases to 1200° C. indicates that the powder particle diameters decrease to between 200 nm and 350 nm, with an average particle diameter of 305.4 nm, and the standard deviation decreases to 18 nm.

Comparison 1

Figure 5:
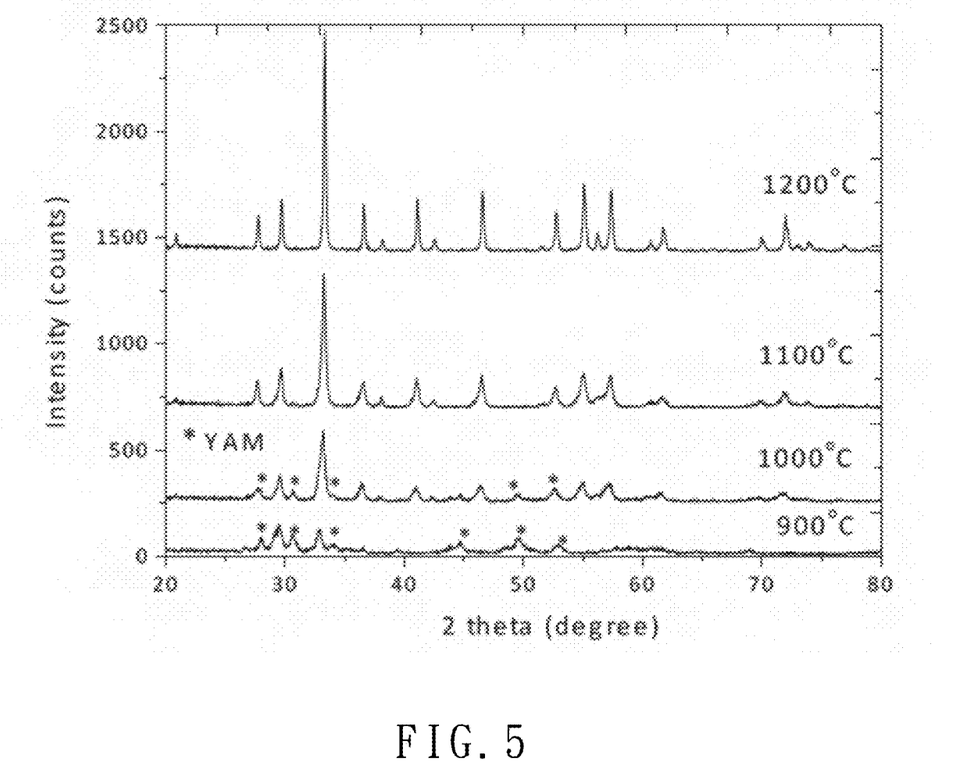
FIG. 5 is an XRD spectrum of a powder sample obtained by calcinating the nanosized YAG powder at 900-1200° C. for one hour according to the present invention.
Figure 6:
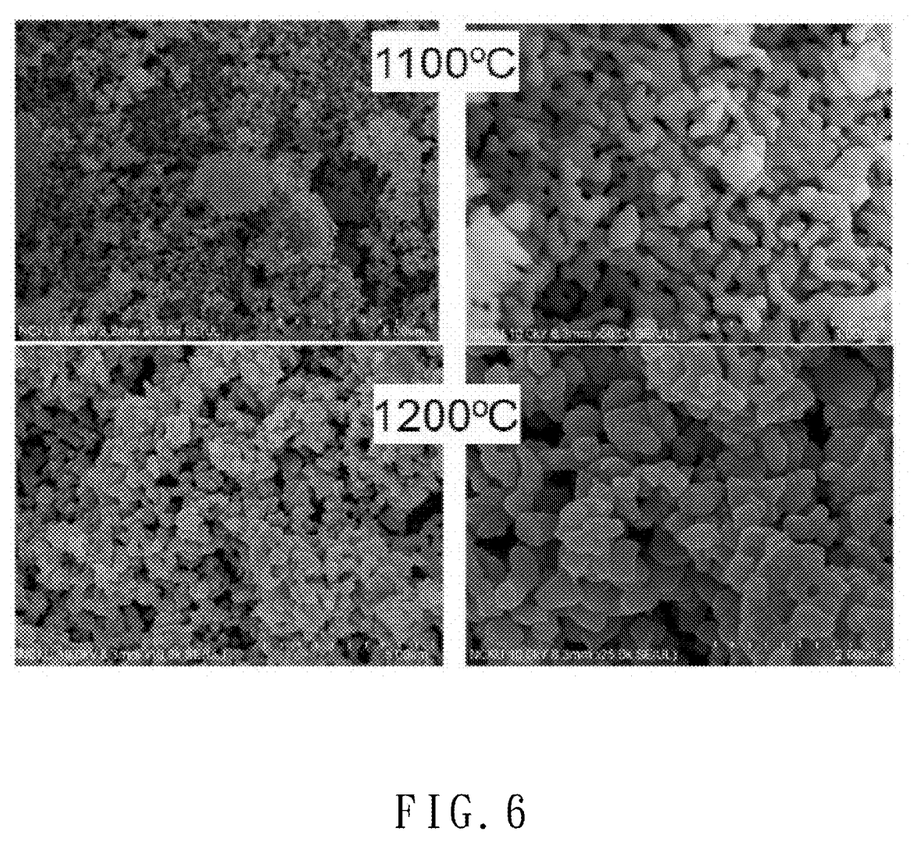
FIG. 6 shows SEM pictures of a powder sample of the nanosized YAG powder kept at 1100° C. and 1200° C. for one hour according to the present invention, respectively.

Given the fact that YAG is a high-temperature product, YAG in a single pure phase can be produced by a solid-state reaction only when calcinated 1600° C. for a sufficiently long temperature-holding period of time. However, with all its reacting ions being uniformly distributed at an atomic level, chemical coprecipitation reduces greatly the temperature required for a phase change. In the second stage, the temperature in a box furnace rises at a rate of 10° C. per minute to eventually reach 900-1200° C. and then stay at 900-1200° C. for one hour. Afterward, the box furnace cools down spontaneously. All the resultant products undergo XRD and SEM analysis. Referring to FIG. 5, there is shown an XRD spectrum of a powder sample obtained by calcinating the nanosized YAG powder at 900-1200° C. for one hour according to the present invention. Referring to FIG. 6, there are shown SEM pictures of a powder sample of the nanosized YAG powder kept at 1100° C. and 1200° C. for one hour according to the present invention, respectively. As revealed by the SEM pictures, given a calcination temperature of 900-1000° C., although the powder turns into YAG phase, YAM phase remains unabated. It is only when the temperature increases to 1100° C. that the powder turns into a single phase YAG completely, thereby indicating that this process technique requires a high temperature of 1100° C. or above in order to effectuate a complete phase change. However, given a calcination temperature of 1100° C., the powder particle diameters are mostly less than 100 nm, and a conspicuous vermicular structure comes into being. When the temperature increases to 1200° C., not only do the powder particle diameters increase markedly, but the particle diameters also fall substantially into the range of 100-500 nm, not to mention that the vermicular structure is dwindling, thereby indicating that a reduction in the time spent on staying at a low temperature is effective in precluding the vermicular structure which might otherwise arise from the mutual sintering of crystals.

Comparison 2

Figure 7:
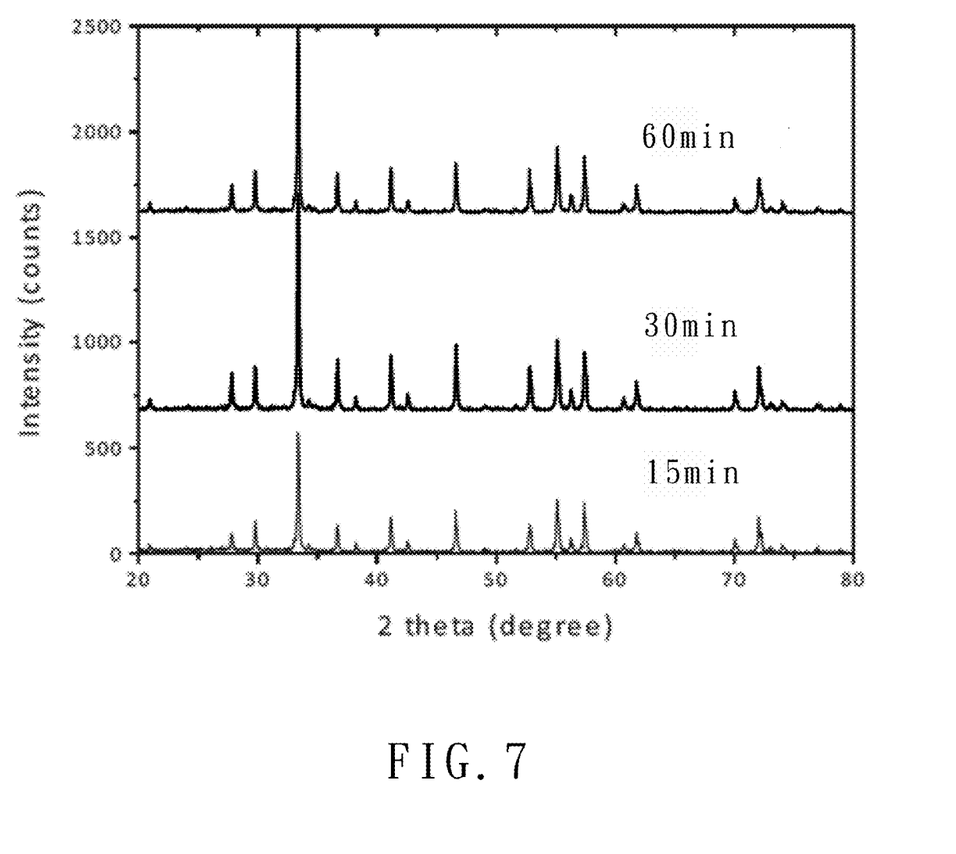
FIG. 7 is an XRD spectrum of a coprecipitation product calcinated at 1400° C. for 15-60 minutes according to the present invention.
Figure 8:
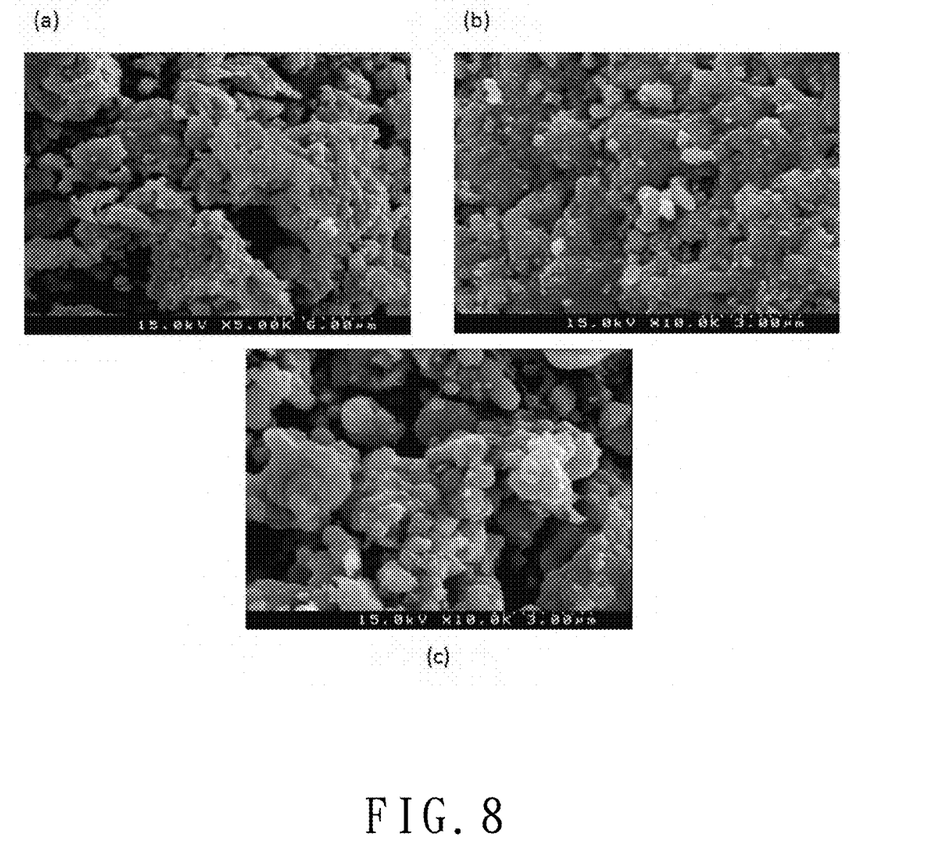
FIG. 8 shows SEM pictures of a powder which did not undergo an impurity-removing process but underwent calcination at 1400° C. for 15 minutes (picture a), 30 minutes (picture b) and 60 minutes (picture c) according to the present invention.

Comparison 1 indicates that a conspicuous vermicular structure forms by calcination at 1100° C. for one hour, and that the vermicular structure wanes as soon as the calcination temperature rises to 1200° C. Hence, Comparison 1 indicates that, at a low temperature, crystal tends to grow by orientation attachment and thus causes the vermicular structure. To bring a more desirable calcination condition, Comparison 2 entails circumventing the low-temperature heat treatment stage and directly conducting a calcination quenching experiment on the coprecipitation products in a pipe-shape furnace. The experiment of Comparison 2 involves raising the temperature in the pipe-shape furnace in advance so that attaining the temperature of 1400° C. is immediately followed by placing the coprecipitation powder in a pipe-shape furnace, keeping the temperature for 15-60 minutes, and thereafter removing the coprecipitation powder from the pipe-shape furnace so as for the coprecipitation powder to undergo rapid quenching at room temperature. Referring to FIG. 7, there is shown an XRD spectrum of a coprecipitation product calcinated at 1400° C. for 15-60 minutes according to the present invention. Referring to FIG. 8, there are shown SEM pictures of a powder which did not undergo an impurity-removing process but underwent calcination at 1400° C. for 15 minutes (picture a), 30 minutes (picture b) and 60 minutes (picture c) according to the present invention. As revealed by the SEM pictures, under the 1400° C. high temperature calcination condition, the powder turns into a single phase YAG by just staying at 1400° C. for 15 minutes, indicating that the high-temperature process is effective in enhancing phase change efficiency. By contrast, SEM observation shows that although no conspicuous vermicular structure happens to the powder produced under the aforesaid calcination condition, there is severe sintering among the powder crystals (as shown in FIG. 8), probably because the starting precipitates still contain plenty of chemical residues, such as carbonates and nitrates, and the chemical residues are likely to cause crystals to adhere to each other, and in consequence the crystals get sintered quickly at high temperature when subjected to a calcination process.

Although the present invention is disclosed above by embodiments to illustrate the features and benefits of the present invention, the embodiments are not restrictive of the essential technical features of present invention. Any persons skilled in the art can make some changes and modifications to the embodiments without departing from the spirit and scope of the present invention. Accordingly, the legal protection for the present invention should be defined by the appended claims.

What is claimed is:

1. A method of inhibiting an irregular aggregation of a nanosized powder, the method comprising the steps of:
   (A) providing a nanosized ceramic powder to perform thereon a thermal analysis and thereby attain an endothermic peak temperature;
   (B) performing an impurity-removal heat treatment on the nanosized ceramic powder at a temperature higher than the endothermic peak temperature;
   (C) switching the nanosized ceramic powder from a temperature environment of the impurity-removal heat treatment to an environment of a temperature higher than a phase change temperature of the nanosized ceramic powder, followed by performing a calcination heat treatment on the nanosized ceramic powder in the environment of the temperature higher than the phase change temperature of the nanosized ceramic powder, wherein the nanosized ceramic powder skips the temperature environment between the impurity-removal heat treatment and the calcination heat treatment to shun generating a vermicular structure.

2. The method of claim 1, wherein the thermal analysis is differential thermal analysis (DTA)/thermogravimetric analysis (TG).

3. The method of claim 1, wherein the nanosized ceramic powder is a Nd:YAG powder.

4. The method of claim 3, wherein the nanosized ceramic powder is prepared by the steps of:
   (a) mixing an ammonium bicarbonate aqueous solution and a Nd:YAG precursor solution to produce a precipitate of the Nd:YAG powder;
   (b) obtaining the Nd:YAG powder by a centrifugal process, followed by rinsing the Nd:YAG powder with alcohol;
   (c) placing the Nd:YAG powder in an oven for drying.

5. The method of claim 4, wherein the Nd:YAG precursor solution is prepared by dissolving an aluminium nitrate, a yttrium nitrate and a neodymium nitrate in deionized water.

6. The method of claim 4, wherein the endothermic peak temperature is 250° C.

7. The method of claim 4, wherein the impurity-removal heat treatment occurs at 250-350° C.

8. The method of claim 4, wherein the calcination heat treatment occurs at 1200-1400° C.

9. The method of claim 8, wherein the calcination heat treatment occurs at 1200° C.

* * * * *